(12) United States Patent
Petri (10) Patent No.: US 8,505,208 B2
(45) Date of Patent: Aug. 13, 2013

(54) SPECTACLE EDGING ASSIST DEVICE AND SPECTACLE LENS SUITABILITY DETERMINING METHOD

(75) Inventor: Eskola Petri, Helsinki (FI)

(73) Assignee: Hoya Corporation, Tokyo (JP)

( * ) Notice: Subject to any disclaimer, the term of this patent is extended or adjusted under 35 U.S.C. 154(b) by 185 days.

(21) Appl. No.: 13/187,966

(22) Filed: Jul. 21, 2011

(65) Prior Publication Data

US 2012/0073153 A1 Mar. 29, 2012

(30) Foreign Application Priority Data

Jul. 27, 2010 (JP) ................................. 2010-167862

(51) Int. Cl.
*G01B 5/00* (2006.01)
(52) U.S. Cl.
USPC .............................................. 33/200; 33/507
(58) Field of Classification Search
USPC ............................................ 33/200, 507, 28
See application file for complete search history.

(56) References Cited

U.S. PATENT DOCUMENTS

| 4,625,418 A | * | 12/1986 | Joncour et al. | .................. 33/200 |
| 4,653,881 A | * | 3/1987 | Joncour | ........................ 351/204 |
| 5,097,600 A | * | 3/1992 | Brule et al. | ....................... 33/28 |

FOREIGN PATENT DOCUMENTS

| DE | 36 06 233 A1 | 9/1986 |
| JP | A-8-136869 | 5/1996 |

OTHER PUBLICATIONS

Nov. 23, 2011 Office Action issued in German Patent Application No. 10 2011 052 165.8 (with English Translation).

* cited by examiner

*Primary Examiner* — Christopher Fulton
(74) *Attorney, Agent, or Firm* — Oliff & Berridge, PLC (57) ABSTRACT

This invention discloses a spectacle edging assist device including a flexible layout chart, chart holding portion, and spectacle frame holding portion. An index used to determine the suitability of a lens while the layout chart is superposed on a spectacle frame is drawn on the flexible layout chart. The chart holding portion holds the layout chart upon bending the layout chart to have a curvature corresponding to the frame curve of the spectacle frame, and also holds the layout chart to be movable in the horizontal direction of the spectacle frame. The spectacle frame holding portion holds the spectacle frame so that its front portion overlaps the layout chart. The chart holding portion brings at least two end pieces of the spectacle frame into contact with the layout chart. A spectacle lens suitability determining method is also disclosed.

5 Claims, 9 Drawing Sheets

SPECTACLE EDGING ASSIST DEVICE AND SPECTACLE LENS SUITABILITY DETERMINING METHOD

BACKGROUND OF THE INVENTION

The present invention relates to a spectacle edging assist device and a spectacle lens suitability determining method which are used to select spectacle lenses suitable for a spectacle frame.

In general, spectacles are formed such that the pupils of a spectacle wearer and the optical centers of lenses coincide with each other when viewed from the front side. To attach lenses onto the spectacle frame of spectacles of this kind, target positions (eyepoints) corresponding to the pupil positions are set on the spectacle frame first. These target positions are set using the pupillary distance of the spectacle wearer. That is, positions spaced apart from each other by the pupillary distance to have, as their center, the horizontal center of the spectacle frame are set as the target positions.

Next, a lens having a size that can be attached onto the rim portion of the spectacle frame is selected. This lens is a disk-shaped uncut lens. The lens selected by this lens selection operation is a lens having a minimum outer diameter larger than the outer diameter of the rim portion while its optical center is positioned at the target position. This lens selection operation is performed using a spectacle edging assist device as described in, for example, Japanese Patent Laid-Open No. 8-136869 (Reference 1). The selected lens undergoes so-called framing. In this framing, a disk-shaped uncut lens is transformed into a shape conforming to that of the rim portion of the spectacle frame. This framing is done while the optical center of the lens coincides with the target position.

The spectacle edging assist device disclosed in the Reference 1 includes a base on which a scale is graduated, and a holding member which holds the front portion of the spectacle frame so that it overlaps the scale. A dummy lens is attached on this front portion. That is, this spectacle edging assist device is formed such that the operator can observe the scale through the dummy lens. The scale is graduated on the flat surface the base, and the holding member holds the front portion of the spectacle frame so that it is superposed on this flat surface.

To perform the above-mentioned lens selection operation using this spectacle edging assist device, a layout chart on which indices used to determine the suitability of lenses are drawn is employed. The indices include the shapes of a plurality of lenses having different outer diameters, and the optical centers of these lenses. In the selection operation, the layout chart is mounted on the base first, and the front portion of the spectacle frame is mounted on this layout chart next. Note that the above-mentioned operation may be facilitated by placing, in advance, a mark at the target position on the dummy lens of the spectacle frame. Note also that the layout chart is sometimes called a lens chart or a lens card.

After the operator superposes the spectacle frame on the layout chart, he or she compares the lenses drawn on the layout chart and the rim portion of the spectacle frame with each other to select a lens while moving the layout chart. At this time, the operator selects a lens having a minimum outer diameter larger than the outer diameter of the rim portion of the spectacle frame. The operator then superposes the optical center of the selected lens on the mark to visually confirm that the outer shape of this lens falls outside the rim portion.

In recent years, eyeglasses called, for example, sport glasses are available. The spectacle frame of spectacles of this kind is formed to have an angle of elevation larger than normal spectacles, and is therefore considerably curved to cover the spectacle wearer's face.

The spectacle edging assist device as disclosed in the Reference 1 cannot use a spectacle frame having a frame curve which is as large as those of spectacle frames employed in the above-mentioned sport glasses. This is mainly for the following two reasons. First, it is difficult to accurately mount the layout chart because the spectacle frame is considerably curved.

Note that the frame curve is the average of curves (the curvatures of arcs or spheres) which pass through the right end piece, bridge, and left end piece of a frame. That is, the frame curve means the average curvature of curved surface shapes formed by the frame in portions in which the lenses are framed. On the other hand, the frame curve is likely to interlock with the angle of curvature, so it can also be substituted with the angle of curvature under a predetermined condition.

Second, the rim portion of the spectacle frame is greatly inclined with respect to the layout chart on the base. The layout chart is almost horizontally mounted on the base. On the other hand, the rim portion (dummy lens) of the spectacle lens is inclined to be gradually separated from the layout chart in the direction from the horizontal center of the spectacle frame toward the ear side. The rim portion appears smaller in the horizontal direction than its actual horizontal dimension when viewed from above. Hence, when a lens drawn on the layout chart is selected by observing the layout chart through the rim portion, a lens suitable for a rim portion which appears smaller than its actual size, that is, a lens having an outer diameter smaller than the actual outer diameter of the rim portion is selected. If such a lens is attached onto the rim portion after framing, a space (missing portion) is generated between the rim portion and the lens.

SUMMARY OF THE INVENTION

It is an object of the present invention to provide a spectacle edging assist device and a spectacle lens suitability determining method which can select a lens suitable for a spectacle frame having a relatively large frame curve.

In order to achieve the above-mentioned object, according to an aspect of the present invention, there is provided a spectacle edging assist device comprising a flexible layout chart on which an index used to determine suitability of a lens while the layout chart is superposed on a spectacle frame is drawn, a chart holding portion which holds the layout chart upon bending the layout chart to have a curvature corresponding to a frame curve of the spectacle frame, and also holds the layout chart to be movable in a horizontal direction of the spectacle frame, and a spectacle frame holding portion which holds the spectacle frame so that a front portion thereof overlaps the layout chart, wherein the chart holding portion brings at least two end pieces of the spectacle frame into contact with the layout chart.

According to another aspect of the present invention, there is provided a spectacle lens suitability determining method comprising the steps of bending, in a direction identical to a direction of a frame curve of a spectacle frame, a layout chart on which an index used to determine suitability of a lens while the layout chart is superposed on the spectacle frame is drawn, positioning the spectacle frame to fall within the layout chart, and superposing the spectacle frame on the layout chart so that at least two end pieces of the spectacle frame come into contact with the layout chart, and determining the suitability of the lens by moving at least one of the layout chart and the spectacle frame relative to the other to position the index relative to the spectacle frame, wherein the determining step is executed while the layout chart is bent with a curvature not less than a curvature which matches the frame curve of the spectacle frame.

DESCRIPTION OF THE PREFERRED EMBODIMENTS

First Embodiment

A spectacle edging assist device according to the first embodiment of the present invention will be described in detail below with reference to FIGS. 1 to 14.

Figure 1:
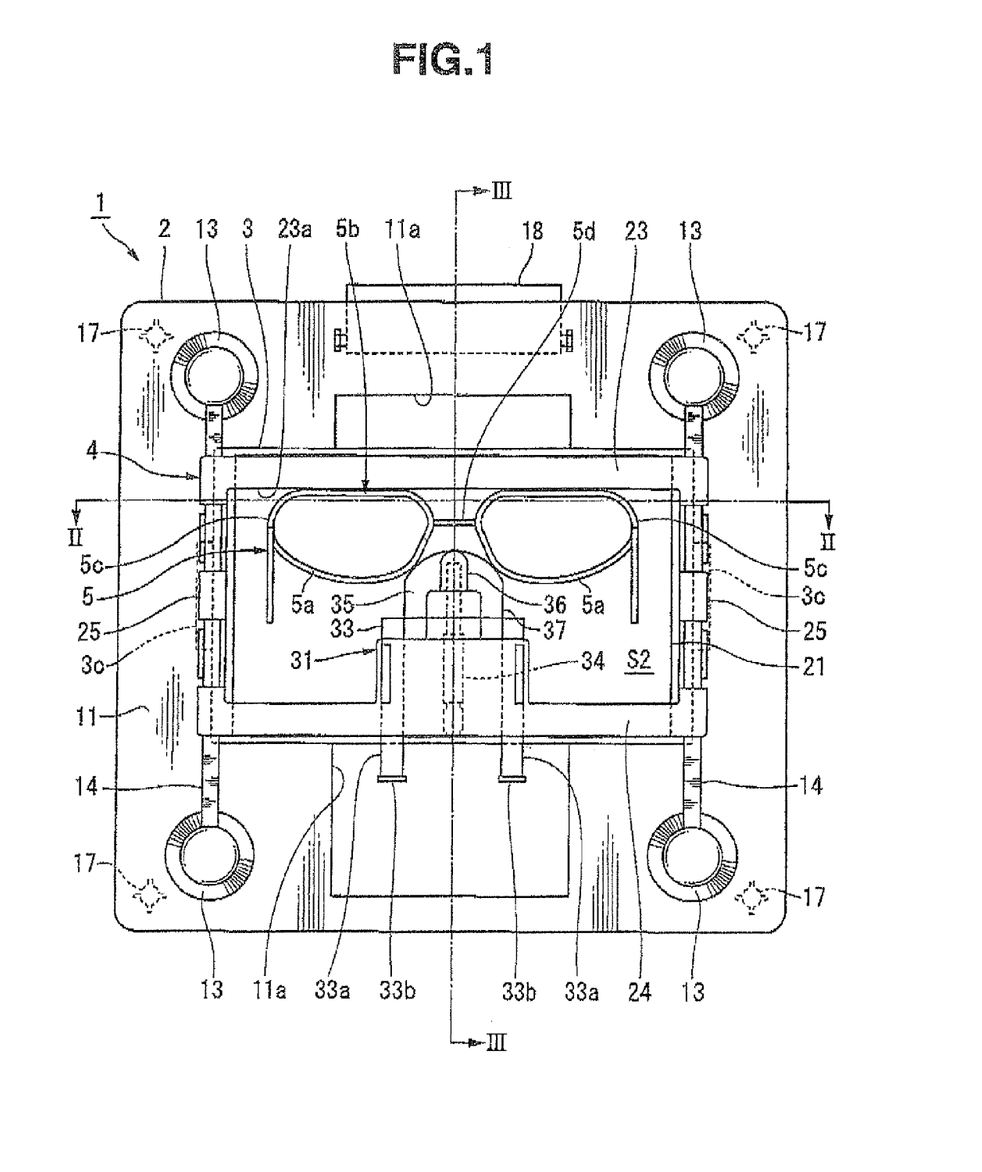
FIG. 1 is a plan view of a spectacle edging assist device according to the first embodiment of the present invention.

A spectacle edging assist device 1 shown in FIG. 1 includes a base 2, and a chart support table 3 and spectacle frame holder 4 which are attached on the base 2. FIG. 1 shows the state in which the suitability of lenses is determined upon attaching a spectacle frame 5 onto the spectacle edging assist device 1. In the following description, the upper side in FIG. 1 (the upper side while the spectacle frame 5 is in use) will be referred to as the upper side or the upper portion of the device, and its opposite side will be referred to as the lower side or the lower portion of the device. Also, in the following description, the left side in FIG. 1 will be referred to as the left side of the device, and the right side in FIG. 1 will be referred to as the right side of the device. Moreover, in the following description, a direction coming out of the paper of FIG. 1 will be referred to as "upward", and its opposite direction will be referred to as "downward".

The base 2 is formed in a box shape which opens downward. "Downward" means herein a direction going into the paper of FIG. 1. More specifically, the base 2 includes a main plate 11 (see FIG. 1) formed in a quadrangular shape when viewed from the plan view, and four side plates 12 (see FIGS. 2, 3, and 12) extending downward from the four sides of the main plate 11. In this embodiment, the base 2 serves as a base portion defined in claim 3 according to this invention.

Four columns 13 for supporting the spectacle frame holder 4 (to be described later) are provided at the four corners of the main plate 11. Guide rods 14 extend horizontally across the distal ends of the two columns 13 positioned on the left side of the base 2 among the four columns 13, and across the distal ands of the two columns 13 positioned on the right side of the base 2 among the four columns 13. The guide rods 14 are attached on the columns 13 to extend parallel to the main plate 11 and to each other.

Figure 2:
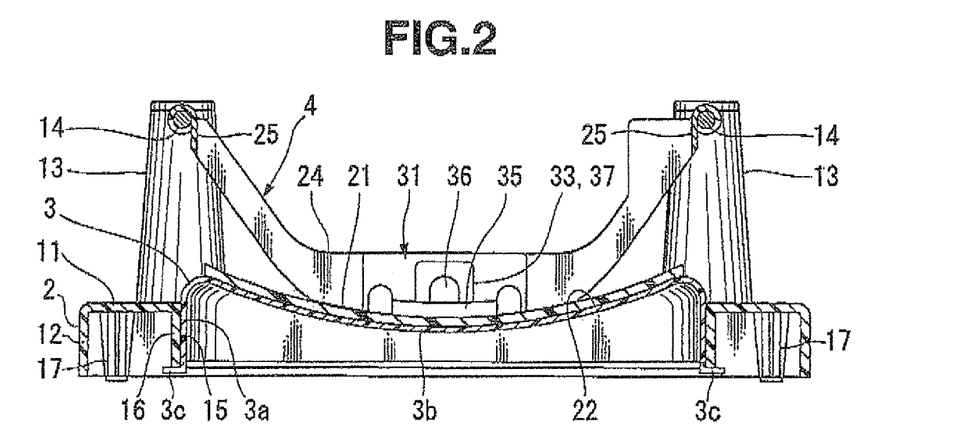
FIG. 2 is a sectional view taken along a line II-II in FIG. 1.
Figure 3:
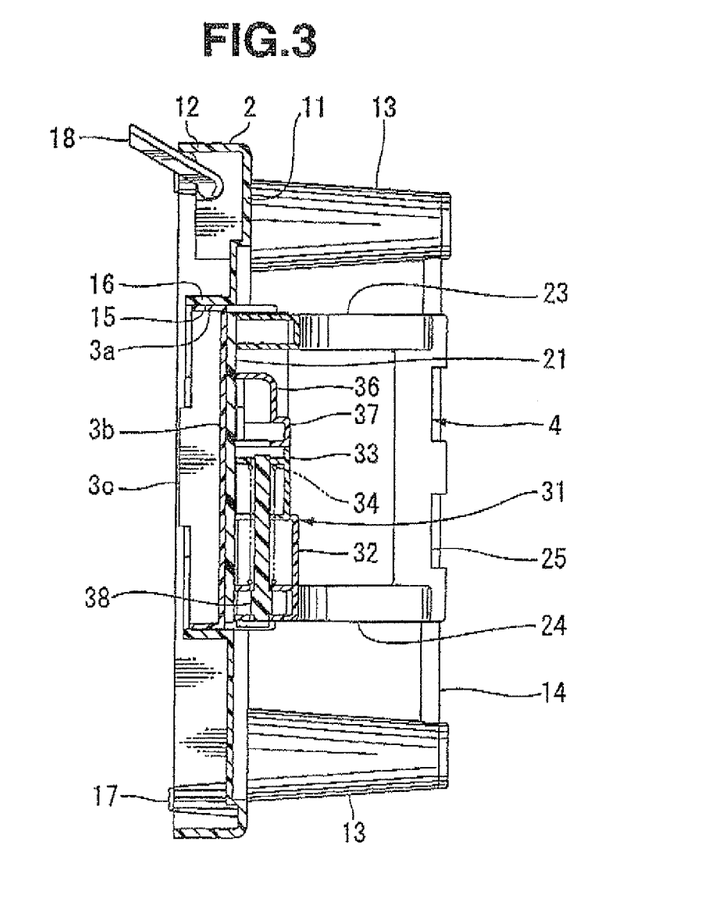
FIG. 3 is a sectional view taken along a line III-III in FIG. 1.
Figure 12:
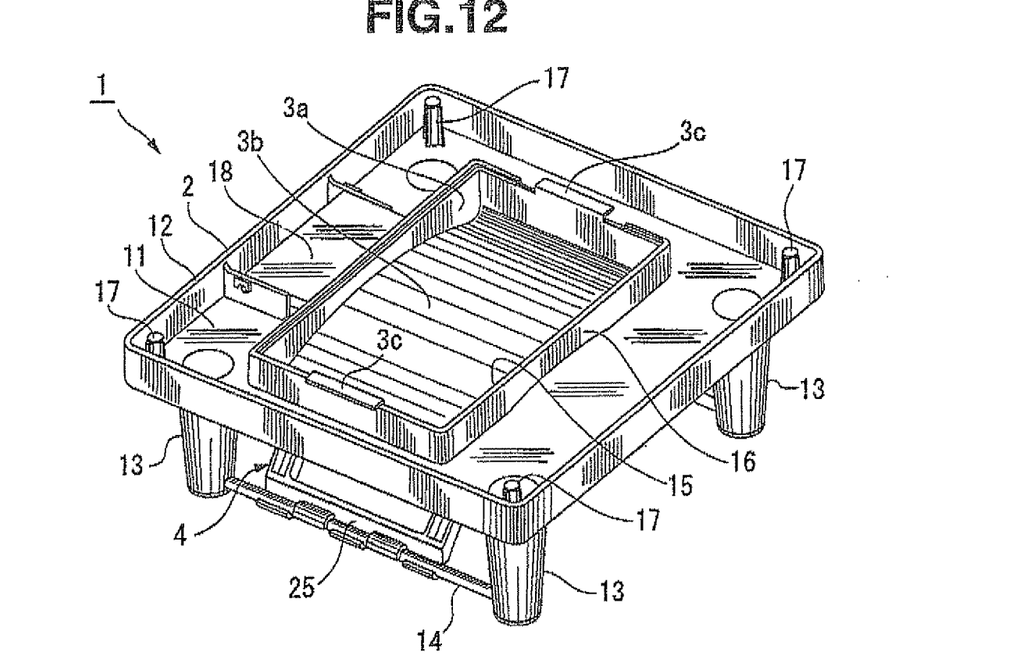
FIG. 12 is a perspective view showing the spectacle edging assist device when viewed from the back side.

A hole 15 in which the chart support table 3 (to be described later) is to be fitted is formed at the central portion of the main plate 11, as shown in FIGS. 2, 3, and 12. The hole 15 is formed by an opening in a rectangular cylinder 16 extending downward from the main plate 11. Also, a recess 11a is formed at the horizontal central portion of the main plate 11 so as to extend upward and downward from the hole 15. The recess 11a is formed to prevent the spectacle frame holder 4 (to be described later) from interfering with the main plate 11 when the spectacle frame holder 4 moves upward.

Rod-shaped legs 17 are formed at the four corners of the main plate 11 on the back side to be in contact with a work table (not shown), as shown in FIG. 12. Also, a foldaway plate-shaped auxiliary leg member 18 is provided on the back side of the upper portion of the main plate 11 to tilt the base 2 on the work table (not shown). The auxiliary leg member 18 is attached on the base 2 to be swingable between an accommodation position shown in FIG. 12 and a use position indicated by a solid line in FIG. 3. The auxiliary leg member 18 positioned at the use position abuts against the side plates 12 from below to support the load of the upper portion of the base 2 (the upper portion of the spectacle frame 5 while it is in use), as shown in FIG. 3. When the auxiliary leg member 18 is at the use position, the base 2 is tilted so that its upper portion becomes higher than its lower portion.

Figure 4:
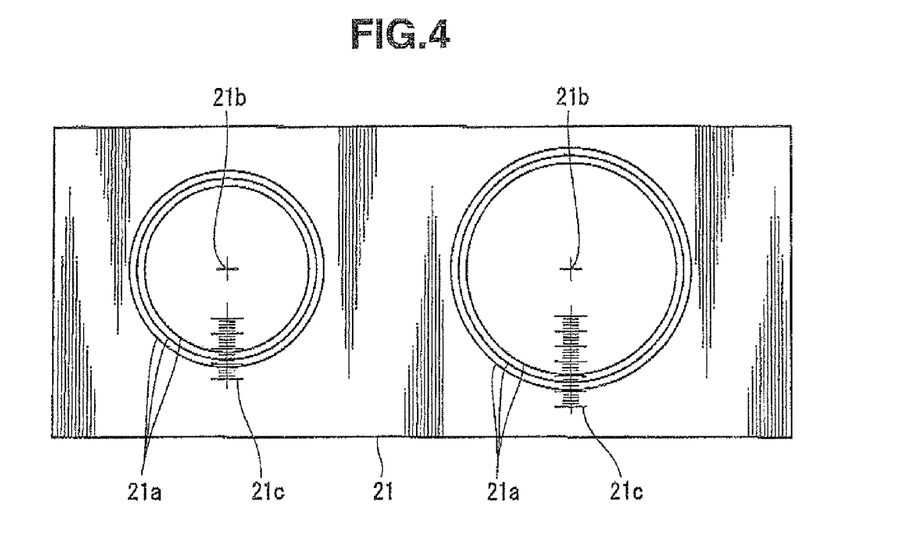
FIG. 4 is a plan view of a layout chart.

The chart support table 3 is used to bend and support a layout chart 21 shown in FIG. 4. As will be described in detail later, the layout chart 21 is bent to have a curvature corresponding to the frame curve of the spectacle frame 5 (see FIG. 1). In this embodiment, the chart support table 3 serves as a chart support portion according to this invention.

The layout chart 21 is formed in a horizontally elongated rectangular shape using a flexible material such as paper or plastic. Indices used to determine the suitability of lenses while the layout chart 21 is superposed on the spectacle frame 5 are drawn on the layout chart 21. The indices include, for example, outer shapes 21a of a plurality of lenses having different outer diameters, optical centers 21b of these lenses, and eyepoint scales 21c. The eyepoint scales 21c are used to compare the position of the near eyepoint of the target lens with a rim portion 5a of the spectacle frame 5 when this lens is a progressive-power lens. Note that when the target lens is a progressive-power lens, a distance eye point (not shown) can be provided as an index.

The chart support table 3 has a box shape which opens downward and detachably fits in the hole 15 from below, as shown in FIGS. 2 and 3. More specifically, the chart support table 3 includes a cylindrical portion 3a which fits in the inner surface of the rectangular cylinder 16 of the base 2, and a support plate 3b which seals the opening above the cylindrical portion 3a. Stoppers 3c which abut against the lower end of the rectangular cylinder 16 from below are provided at the two horizontal sides of the open end of the cylindrical portion 3a. The stoppers 3c are formed in plate shapes which project from the lower open end of the cylindrical portion 3a toward the left and right sides.

The support plate 3b is formed to be larger than the spectacle frame 5 when viewed from the plan view shown in FIG. 1. Also, the support plate 3b is formed in a shape which is convexly curved downward when viewed from the upper side of the device, as shown in FIGS. 2 and 5 to 10. That is, the support plate 3b is curved so that its two horizontal sides become relatively high, and its horizontal central portion becomes relatively low. The support plate 3b supports the layout chart 21 along a concavely curved surface 22 formed on its front surface (upper surface), as shown in FIGS. 5 to 8. In this embodiment, the device includes a member which maintains the layout chart 21 in tight contact with the concavely curved surface 22 of the support plate 3b, as shown in, for example, FIG. 8. This member includes an upper bar 23 (see FIGS. 5 to 8 and 11) of the spectacle frame holder 4 (to be described later), and a lower bar 24 (see FIGS. 9 to 11) of the spectacle frame holder 4.

The chart support table 3 attached on the base 2 is selected from a plurality of chart support tables 3 prepared in advance. These plurality of chart support tables 3 are formed to have concavely curved surfaces 22 with different curvatures. Examples of the curvatures of the concavely curved surfaces 22 of the chart support tables 3, which are converted into the curve values of the spectacle frame 5, include curves of 0.5, 1.0, 2.0, 3.0, 4.0, 5.0, 6.0, 7.0, and 8.0.

Figure 5:
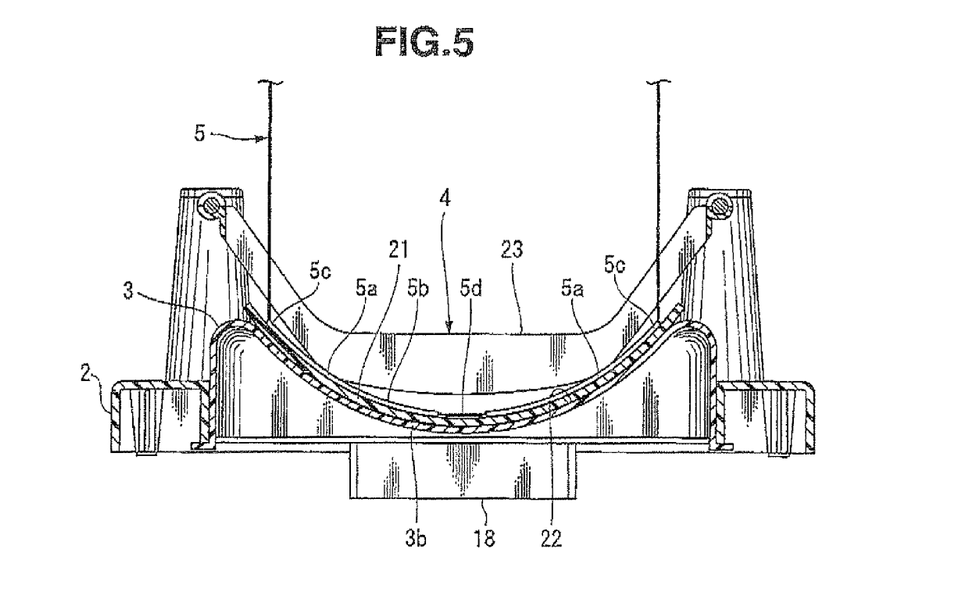
FIG. 5 is a sectional view showing the state in which a spectacle frame is superposed on the layout chart.
Figure 6:
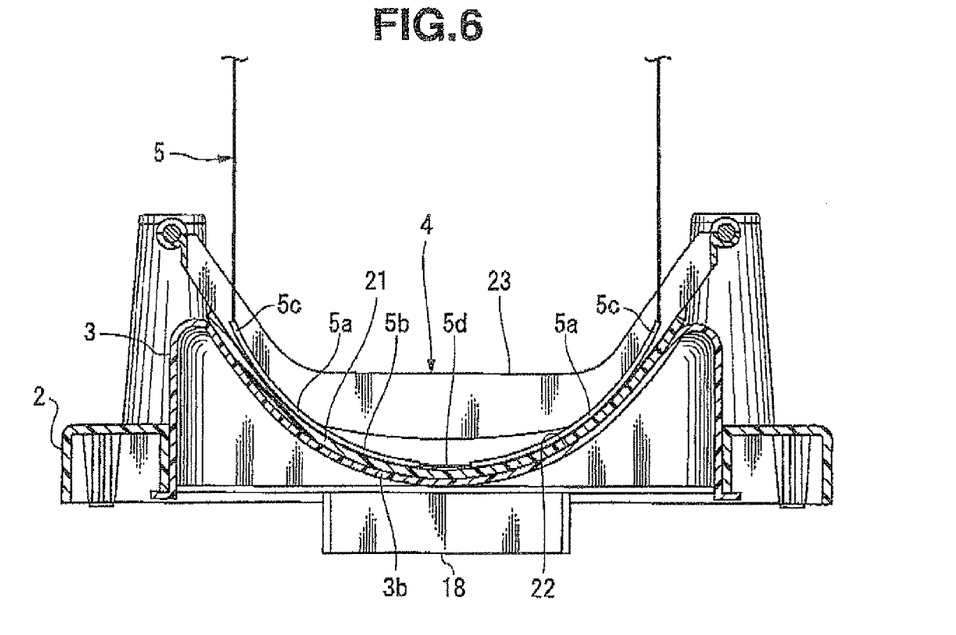
FIG. 6 is a sectional view showing the state in which the spectacle frame is superposed on the layout chart.

A chart support table 3 having a curve value which is larger than the frame curve of the target spectacle frame 5 and is closest to this frame curve is selected as the chart support table 3 to be attached onto the base 2. If the curve value of the chart support table 3 is equal to that of the frame curve of the spectacle frame 5, the layout chart 21 comes into contact with the entire region of a front portion 5b of the spectacle frame 5, as shown in FIGS. 5 and 6.

More specifically, the layout chart 21 is designed such that the entire region extending from two end pieces 5c of the spectacle frame 5 to a bridge portion 5d of the spectacle frame 5 comes into contact with the upper surface of the layout chart 21. FIG. 5 shows the state in which the spectacle frame 5 is mounted on a chart support table 3 having a relatively small curve value, and FIG. 6 shows the state in which the spectacle frame 5 is mounted on a chart support table 3 having a relatively large curve value. In this manner, if the layout chart 21 is bent along the front portion 5b, the indices (the outer shapes 21a of lenses) of the layout chart 21 and the rim portion 5a of the spectacle frame 5 can easily be compared with each other, and a precise comparison result can be obtained as well.

Figure 7:
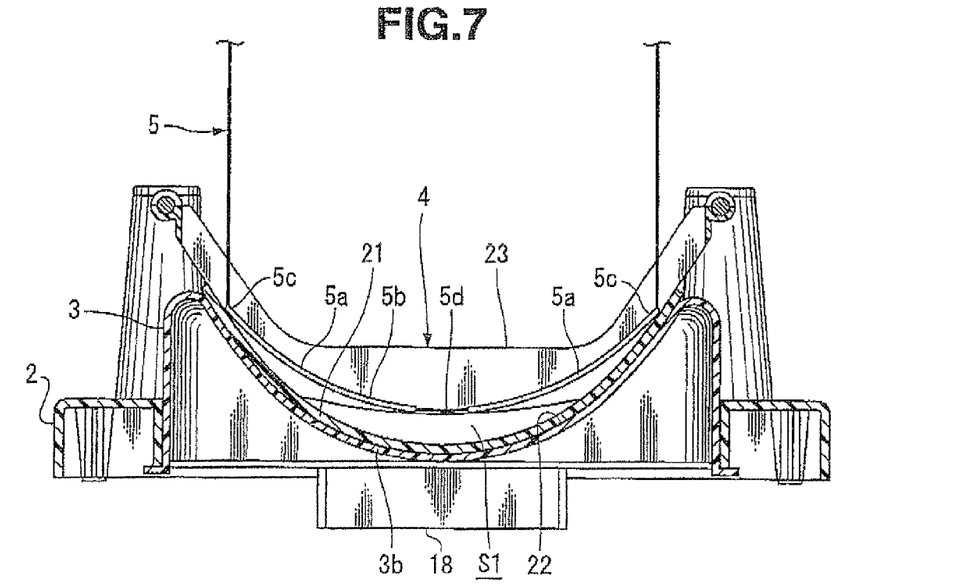
FIG. 7 is a sectional view showing the state in which the spectacle frame is superposed on the layout chart.
Figure 8:
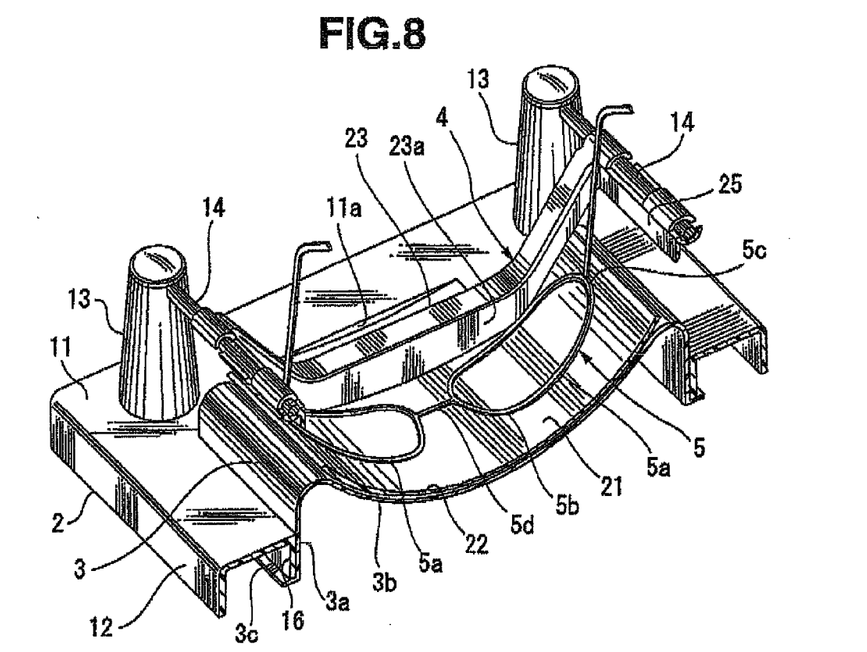
FIG. 8 is a perspective view showing the state in which the spectacle frame is superposed on the layout chart, and does not illustrate the lower half part of the spectacle edging assist device.

On the other hand, if the curve value of the chart support table 3 is larger than that of the frame curve of the spectacle frame 5, the two end pieces 5c of the spectacle frame 5 come into contact with the layout chart 21, so a gap S1 is formed between the bridge portion 5d and the layout chart 21, as shown in FIG. 7. That is, the chart support table 3 according to this embodiment is configured to bring at least the two end pieces 5c of the spectacle frame 5 into contact with the layout chart 21.

In such a case, the layout chart 21 is inclined more than the rim portion 5a of the spectacle frame 5 with respect to the horizontal plane. When the chart support table 3 and spectacle frame 5 are viewed from above in this state, the outer shape 21a of a lens which appears smaller in the horizontal direction than its actual horizontal dimension matches the rim portion 5a. That is, in this case, a lens which appears smaller than its actual size, that is, a lens larger than the rim portion 5a can be selected.

The spectacle frame holder 4 includes the upper bar 23, the lower bar 24, and a pair of left and right sliders 25, as shown in FIGS. 9 to 11 and 13. The upper bar 23 and lower bar 24 have a function of maintaining the layout chart 21 in tight contact with the chart support table 3. The sliders 25 connect the two horizontal ends of each of the upper bar 23 and lower bar 24. In this embodiment, the spectacle frame holder 4 serves as a spectacle frame holding portion according to this invention.

The upper bar 23 and lower bar 24 have a horizontally extending shape when viewed from the plan view, as shown in FIG. 1, and a shape convexly curved downward (toward the base 2) when viewed from the upper or lower side of the device, as shown in FIG. 2. The upper bar 23 and lower bar 24 are positioned such that a gap corresponding to the thickness of the layout chart 21 is formed between them and the chart support table 3, as shown in FIGS. 5, 6, 9, and 10. A gap (space) S2 into which the spectacle frame 5 is to be inserted is formed between the upper bar 23 and the lower bar 24, as shown in FIG. 1.

The upper bar 23 is formed to have a horizontally linearly extending shape when viewed from the plan view, as shown in FIG. 1. A flat pressure-receiving surface 23a against which the front portion 5b of the spectacle frame 5 abuts is formed in a portion in the upper bar 23, which is opposed to the lower bar 24. A holding mechanism 31 for holding the spectacle frame 5 is provided at the horizontal central portion of the lower bar 24, as shown in FIGS. 9 to 11 and 13. The holding mechanism 31 includes, for example, a case 32 formed at the central portion of the lower bar 24, a slide member 33 supported by the case 32, and a compression coil spring 34 provided in the case 32.

Figure 13:
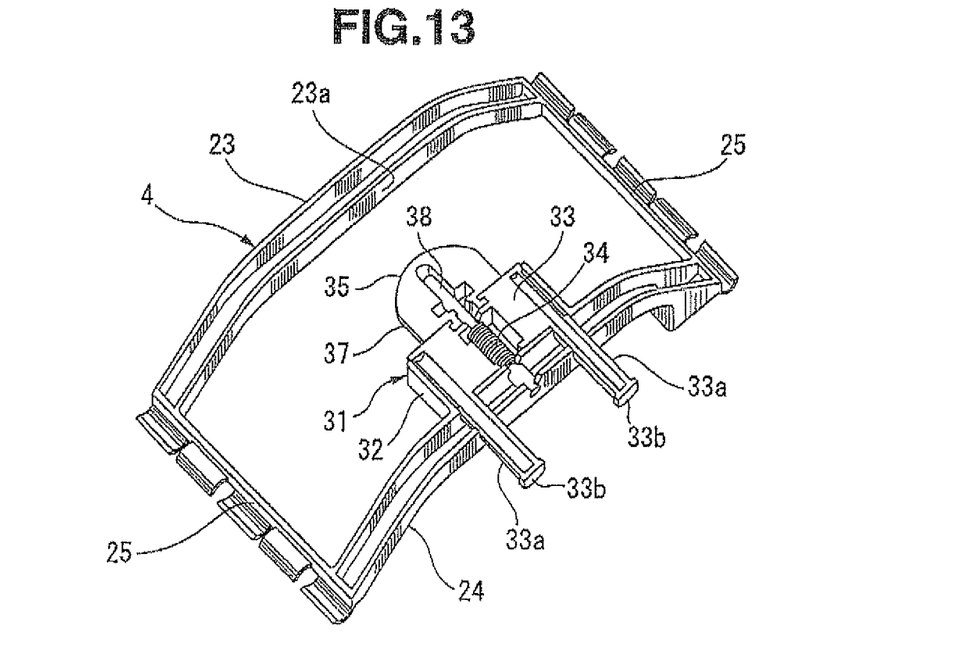
FIG. 13 is a perspective view showing a frame holding portion when viewed from the back side.

The slide member 33 is supported by the case 32 to be movable vertically when viewed from the plan view. The compression coil spring 34 biases the slide member 33 toward the upper side of the device. Also, the slide member 33 includes a pair of left and right bar-shaped guide members 33a which project downward upon running through the lower bar 24, as shown in FIG. 13. Stoppers 33b are formed at the distal ends of the guide members 33a to regulate movement of the slide member 33 to the upper side of the device.

Figure 9:
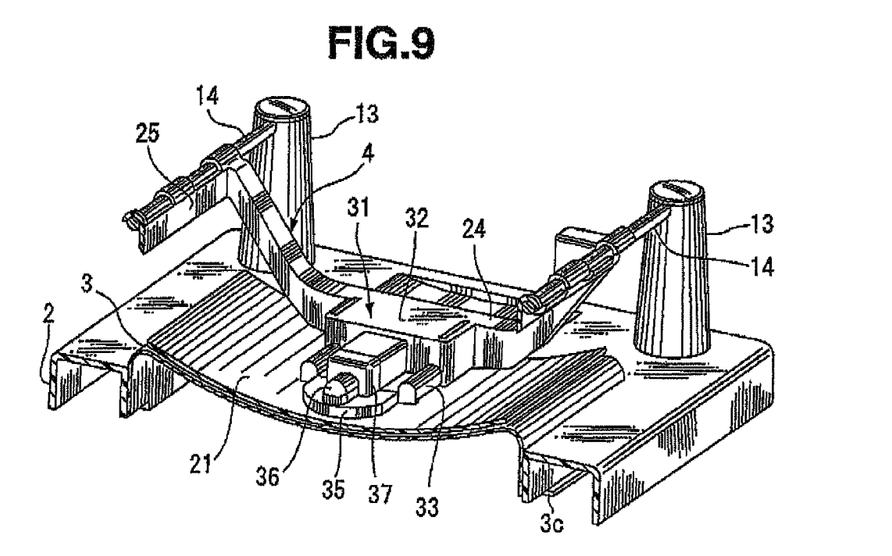
FIG. 9 is a perspective view showing the lower half part of the spectacle edging assist device.
Figure 10:
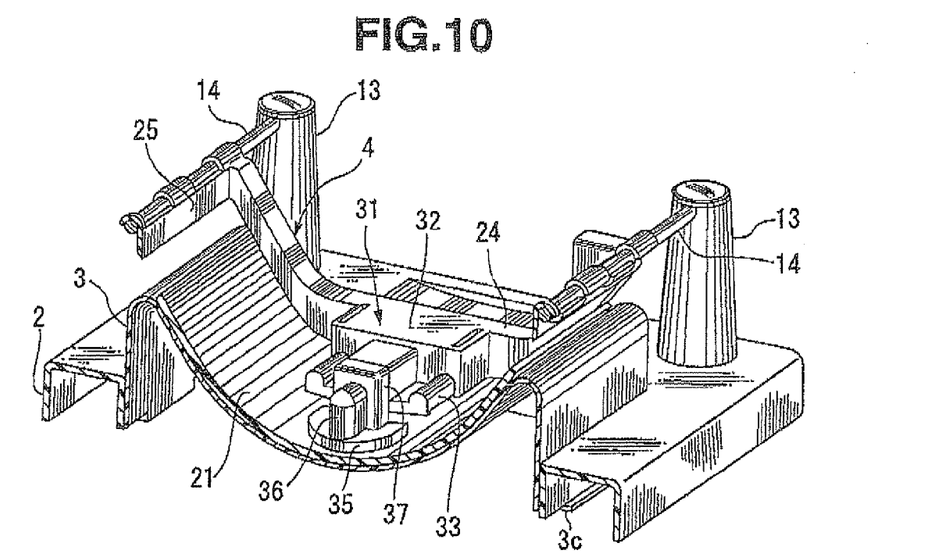
FIG. 10 is a perspective view showing the lower half part of the spectacle edging assist device.
Figure 11:
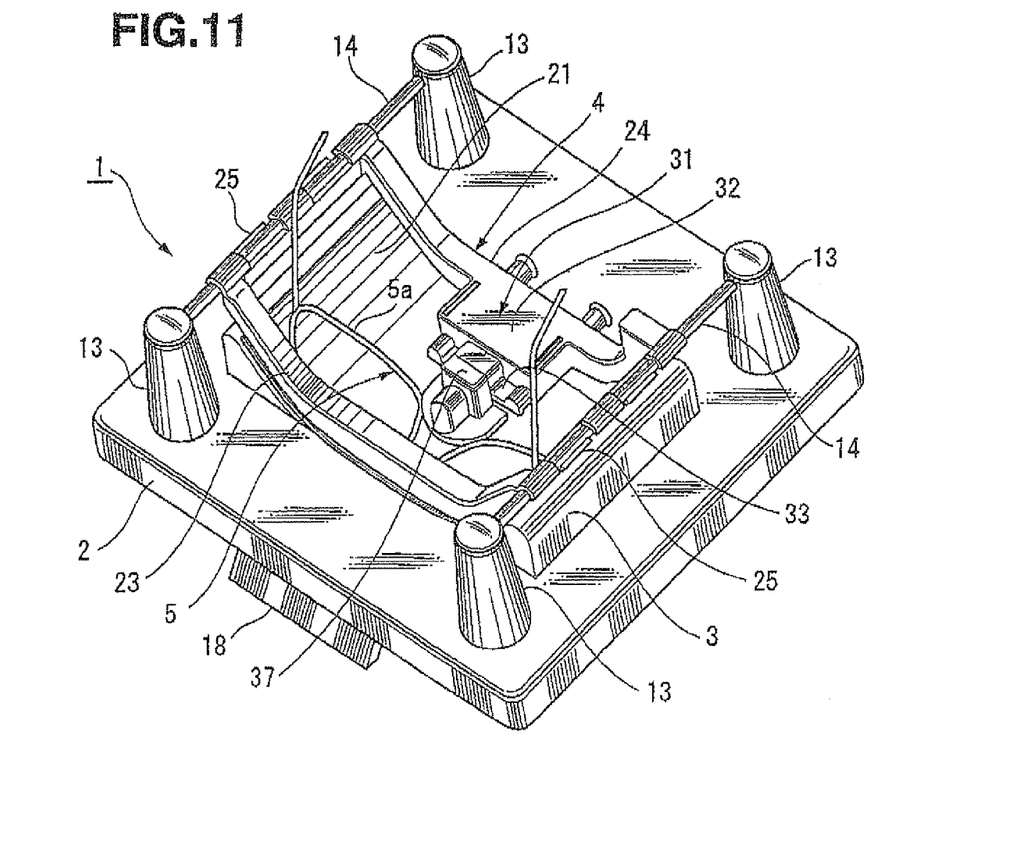
FIG. 11 is a perspective view of the spectacle edging assist device.

The slide member 33 is formed such that its end on the upper side of the device projects from the case 32 toward the upper bar 23. A press unit 37 including a pressing plate 35 and protrusion 36 are provided at the end of the slide member 33 on the upper side of the device, as shown in FIGS. 9 to 11. The pressing plate 35 is used to press the rim portion 5a of the spectacle frame 5. The protrusion 36 is used to press a nose pad portion (not shown) of the spectacle frame 5. The spectacle frame 5 shown in FIG. 11 is pressed against the upper bar 23 by the slide member 33 while the pressing plate 35 of the slide member 33 is kept in contact with the rim portion 5a.

The press unit 37 according to this embodiment is detachably attached onto the slide member 33. A plurality of types of press units 37 having different heights are prepared, as shown in FIGS. 9 and 10. If the spectacle frame 5 has a relatively small frame curve, a press unit 37 having a relatively low height is used, as shown in FIG. 9. If the spectacle frame 5 has a relatively large frame curve, a press unit 37 having a relatively high height is used, as shown in FIG. 10. That is, the spectacle frame 5 can reliably be held free from the influence of the size of its frame curve.

The compression coil spring 34 is inserted between the lower bar 24 and the upper portion of the slide member 33 while a pin 38 of the lower bar 24 runs through it, as shown in FIGS. 3 and 13. The pin 38 is fixed on the lower bar 24 while extending toward the upper bar 23, and inserted in the slide member 33. In this embodiment, the holding mechanism 31 and upper bar 23 serve as a "holding member" defined in claim 4 according to this invention.

The guide rods 14 run through the pair of sliders 25 which connect the upper bar 23 and lower bar 24, so the sliders 25 are movably supported by the base 2 via the guide rods 14, as shown in FIG. 2. That is, the spectacle frame holder 4 can be translated along the guide rods 14 while the spectacle frame 5 is held by the upper bar 23 and lower bar 24.

A method of determining the suitability of a spectacle lens using the spectacle edging assist device 1 having the above-mentioned configuration will be described next with reference to FIG. 14. The use of the spectacle edging assist device 1 according to this embodiment allows the following two types of determination. First, a usable lens is determined. That is, a lens usable for the target spectacle frame 5 can be selected. Second, it is determined whether the near eyepoint of the lens used falls within the rim portion 5a of the spectacle frame 5 when this lens is a progressive-power lens.

In these types of determination, first, a chart support table 3 which matches the target spectacle frame 5 is selected. At this time, the following two conditions must be satisfied. First, the left and right end pieces 5c of the spectacle frame 5 come into contact with the layout chart 21. Second, no gap S1 is formed between the bridge portion 5d and the layout chart 21, or the gap S1 becomes as narrow as possible. The thus selected chart support table 3 is inserted into the hole 15 in the base 2 from the back side, and attached onto the base 2. After the chart support table 3 is attached onto the base 2, a layout chart setting step is executed, as shown in step S1 of FIG. 14.

In the layout chart setting step, first, the spectacle frame holder 4 is, for example, moved to the lower side of the device relative to the base 2 in FIG. 1 to widely open the opening above the chart support table 3. Next, the operator (not shown) superposes the layout chart 21 on the concavely curved surface 22 of the chart support table 3, and bends it along the concavely curved surface 22. At this time, the layout chart 21 is bent in the same direction as the frame curve of the spectacle frame 5. After that, the operator moves the spectacle frame holder 4 to the upper side of the device, and superposes the upper bar 23 and lower bar 24 on the layout chart 21. As a result, the layout chart 21 undergoes upward movement regulation by the upper bar 23 and lower bar 24, and is held on the chart support table 3 while being bent.

Figure 14:
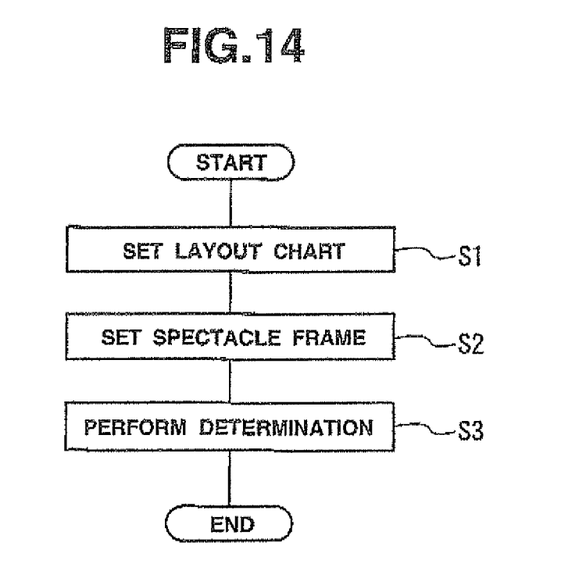
FIG. 14 is a flowchart for explaining a spectacle lens suitability determining method.

In spectacle frame setting step S2 shown in FIG. 14, the operator holds the spectacle frame 5 on the spectacle frame holder 4. A dummy lens is attached onto the rim portion 5a of the spectacle frame 5 in advance. Although not shown, a mark is inscribed on the dummy lens at the position at which it faces the spectacle wearer's pupil.

In holding the spectacle frame 5 on the spectacle frame holder 4, first, the operator moves the slide member 33 to the lower side of the device with his or her fingers against the spring force of the compression coil spring 34. Next, the spectacle frame 5 is inserted between the upper bar 23 and the lower bar 24 from above. In this state, the operator reduces his or her finger's force acting to press the slide member 33, thereby bringing the slide member 33 into contact with the left and right rim portions 5a or nose pad portion of the spectacle frame 5. When the slide member 33 comes into contact with the left and right rim portions 5a or nose pad portions of the spectacle frame 5 with a uniform contact force, the spectacle frame 5 is positioned at the horizontal center of the spectacle frame holder 4.

In this state, the operator removes his or her fingers from the slide member 33, thereby pressing the front portion 5b of the spectacle frame 5 against the upper bar 23 using the spring force of the compression coil spring 34. At this time, the spectacle frame 5 is clamped between the slide member 33 and the upper bar 23, thereby being held so that it is never removed from the device. Also, the spectacle frame 5 is superposed on the layout chart 21, as shown in FIG. 11. The two end pieces 5c of the spectacle frame 5 come into contact with the layout chart 21, as shown in FIGS. 5 to 7. After holding of the spectacle frame 5 is thus completed, the process advances to determining step S3 shown in FIG. 14.

Determination in determining step S3 is done by visually comparing the indices drawn on the layout chart 21 and the spectacle frame 5 with each other by the operator. In determining step S3, first, the outer shapes 21a of a plurality of lenses drawn on the layout chart 21 as indices, and the rim portion 5a of the spectacle frame 5 are compared with each other. Next, the outer shape 21a of a lens having a minimum outer diameter larger than the outer diameter of the rim portion 5a is selected. At least one of the layout chart 21 and the spectacle frame 5 is moved relative to the other so that the optical center 21b of the outer shape 21a of the selected lens coincides with the mark on the dummy lens.

That is, a horizontal positional shift between the optical center 21b and the mark is canceled by horizontally moving the layout chart 21 between the chart support table 3 and the upper bar 23 and lower bar 24. A vertical positional shift between the optical center 21b and the mark is canceled by vertically moving the spectacle frame holder 4 together with the spectacle frame 5 relative to the chart support table 3.

While the optical center 21b and the mark coincide with each other, the outer shape 21a of the selected lens drawn on the layout chart 21 and the rim portion 5a are visually compared with each other to determine whether the outer shape 21a of this lens falls outside the rim portion 5a. If the outer shape 21a of the selected lens falls within the rim portion 5a, the above-mentioned determination is performed again while the optical center 21b of a lens having an outer diameter larger than that of the former lens coincides with the mark.

In this manner, while the optical center 21b and the mark coincide with each other, a lens having an outer diameter larger than that of the rim portion 5a is selected as a lens which matches the spectacle frame 5. Also, when the target lens is a progressive-power lens, it is determined whether the position of the near eyepoint of this lens falls within the rim portion 5a while the distance eyepoint on the layout chart 21 and the mark coincide with each other. This determination is done using the scales 21c graduated on the layout chart 21. The above-mentioned determining operation is performed in determining step S3 for both a right-eye lens and a left-eye lens.

In the spectacle edging assist device 1 according to this embodiment, the layout chart 21 is bent with a curvature corresponding to the frame curve of the spectacle frame 5, and fixed in position so as not to move while the spectacle frame 5 overlaps the layout chart 21. Therefore, even when a spectacle frame 5 having a relatively large frame curve is used, the operator can easily observe the rim portion 5a and the layout chart 21 while they overlap each other. As a result, even when a spectacle frame 5 having a relatively large frame curve is used, the operator can precisely check, for example, the positions of the optical center, distance eyepoint, and near eyepoint of a lens relative to the spectacle frame 5. Also, the operator can precisely select a lens having an outer diameter which matches the spectacle frame 5. Moreover, even when a spectacle frame 5 having a relatively large frame curve is used, the operator can precisely determine whether the near eyepoint of the target lens falls within the rim portion 5a.

Also, in the spectacle edging assist device 1, the left and right end pieces 5c of the spectacle frame 5 are in contact with the layout chart 21, so the curvature of the layout chart 21 never becomes smaller than that of the frame curve of the spectacle frame 5. That is, the layout chart 21 is bent along the front portion 5b of the spectacle frame 5 or to have a curvature larger than that of the frame curve so as to form the gap S2 between it and the bridge portion 5d of the spectacle frame 5.

If the layout chart 21 is bent along the front portion 5b, the indices of the layout chart 21 and the rim portion 5a of the spectacle frame 5 can easily be compared with each other, and a precise comparison result can be obtained as well, as shown in FIGS. 5 and 6. That is, by comparing the outer shapes 21a of a plurality of lenses drawn on the layout chart 21 and the rim portion 5a with each other, a lens having an appropriate outer diameter can be selected. "Appropriate" means herein that no missing portion is generated between a lens and the rim portion 5a while the lens is attached on the rim portion 5a.

On the other hand, if the curvature of the layout chart 21 is larger than that of the frame curve, the layout chart 21 is inclined more than the rim portion 5a, as shown in FIG. 7. Hence, the horizontal dimension of a portion in the layout chart 21, which can be seen through the rim portion 5a, is smaller than its actual horizontal dimension. That is the outer shapes 21a of a plurality of lenses drawn on the layout chart 21 appear smaller in the horizontal direction than their actual horizontal dimensions. In this case, a lens which appears smaller than its actual size, that is, a lens larger than the rim portion 5a can be selected.

Therefore, according to this embodiment, a lens having an appropriate outer diameter or a lens having an outer diameter larger than that of the rim portion 5a can be selected. Such a lens never has a missing portion generated between it and the rim portion 5a while being attached on the rim portion 5a after framing.

The spectacle edging assist device 1 according to this embodiment tolerates the formation of the gap S1 between the layout chart 21 and the bridge portion 5d of the spectacle frame 5. Hence, in preparing a plurality of chart support tables 3 having concavely curved surfaces 22 with different curvatures, there is no need to associate them with the frame curves of all spectacle frames 5. That is, as described in this embodiment, the above-mentioned determination can be performed for almost all types of spectacle frames 5 using only nine types of chart support tables 3.

Therefore, according to this embodiment, many types of spectacle frames 5 can be used, so a spectacle edging assist device with great versatility can be provided.

The spectacle edging assist device 1 according to this embodiment includes the base 2 which detachably supports the chart support table 3, and a plurality of types of chart support tables 3 having different curvatures. Each chart support table 3 holds the layout chart 21 along the concavely curved surface 22. The chart support table 3 attached on the base 2 has a concavely curved surface 22 with a curvature closest to that of the frame curve of the spectacle frame 5. That is, a chart support table 3 corresponding to the frame curve of the spectacle frame 5 is selected and used. Hence, according to this embodiment, the suitability of lenses can precisely be determined for many types of spectacle frames 5 having different frame curves. Also, although this device adopts a configuration which can use many types of spectacle frames 5, its manufacturing cost can be kept low. This is because the base 2, spectacle frame holder 4, etc. do not require replacement.

The spectacle frame holder 4 according to this embodiment includes a holding member (the holding mechanism 31 and upper bar 23) which clamps and holds the front portion 5b of the spectacle frame 5. This holding member can vertically move relative to the layout chart 21. Hence, the spectacle edging assist device 1 according to this embodiment can hold the spectacle frame 5 so as not to shield the interior of the rim portion 5a. The spectacle frame 5 can vertically move relative to the layout chart 21 while being held on the spectacle frame holder 4.

Therefore, according to this embodiment, an operation of matching the indices of the layout chart 21 with the position of the spectacle frame 5 can easily be performed, so the suitability of lenses can quickly be determined, thus improving the productivity.

A spectacle lens suitability determining method according to this embodiment is executed by a layout chart setting step, a spectacle frame setting step, and a determining step. In this suitability determining method, determination is performed while the layout chart 21 appears to be equal in size to the spectacle frame 5 or smaller in the horizontal direction of the spectacle frame 5 than its actual horizontal dimension, as described above. While the layout chart 21 appears to be equal in size to the spectacle frame 5, a precise determination result can be obtained. In contrast, if it is determined whether the outer diameter of a lens matches the rim portion 5a while the layout chart 21 appears smaller in the horizontal direction than its actual horizontal dimension, a lens which never has a missing portion generated between it and the rim portion 5a while being attached on the rim portion 5a is selected.

Therefore, according to this embodiment, even when a spectacle frame 5 having a relatively large frame curve is used, the suitability of lenses can precisely be determined.

The concavely curved surface 22 of each chart support table 3 in this embodiment is formed to have right and left parts with equal horizontal dimensions. Hence, each chart holding portion can be formed such that the end pieces 5c of the spectacle frame 5 always come into contact with the layout chart 21. As a result, according to this embodiment, the suitability of lenses can more precisely be determined.

The slide member 33 of the spectacle frame holder 4 according to this embodiment includes the pressing plate 35 which can come into contact with the rim portion 5a of the spectacle frame 5, and the protrusion 36 which can come into contact with the nose pad portions of the spectacle frame 5. Hence, according to this embodiment, a spectacle edging assist device capable of holding most types of spectacle frames 5 can be provided.

The base 2 according to this embodiment includes the foldaway auxiliary leg member 18. The auxiliary leg member 18 can move between a use position at which the chart support table 3 is tilted so that the upper portion of the spectacle frame 5 held on the spectacle frame holder 4 becomes higher than its lower portion while the spectacle frame 5 is in use, and an accommodation position at which the upper and lower portions of the spectacle frame 5 have the same level. Upon moving the auxiliary leg member 18 to the use position, the layout chart 21 and spectacle frame 5 are inclined toward the operator. Hence, according to this embodiment, a spectacle edging assist device with high operability can be provided.

Second Embodiment

Figure 15:
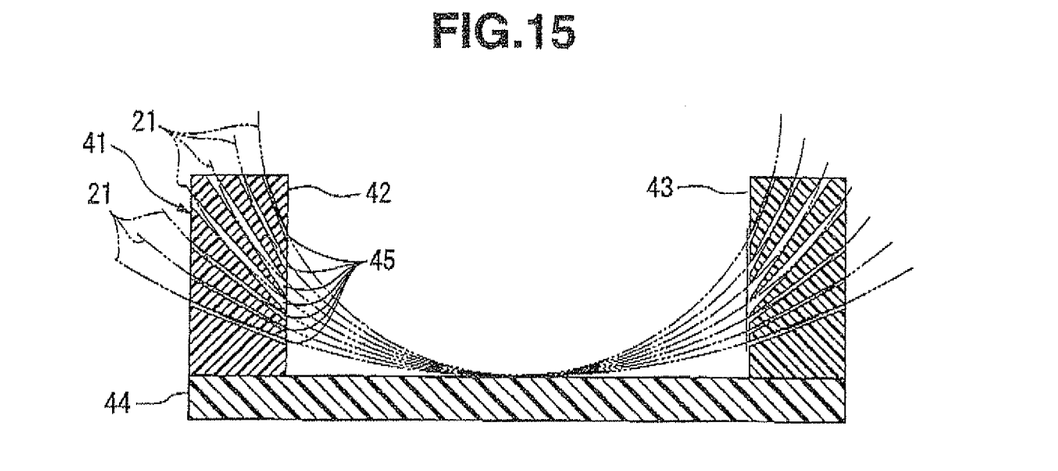
FIG. 15 is a sectional view showing the second embodiment of a chart holding portion.
Figure 16:
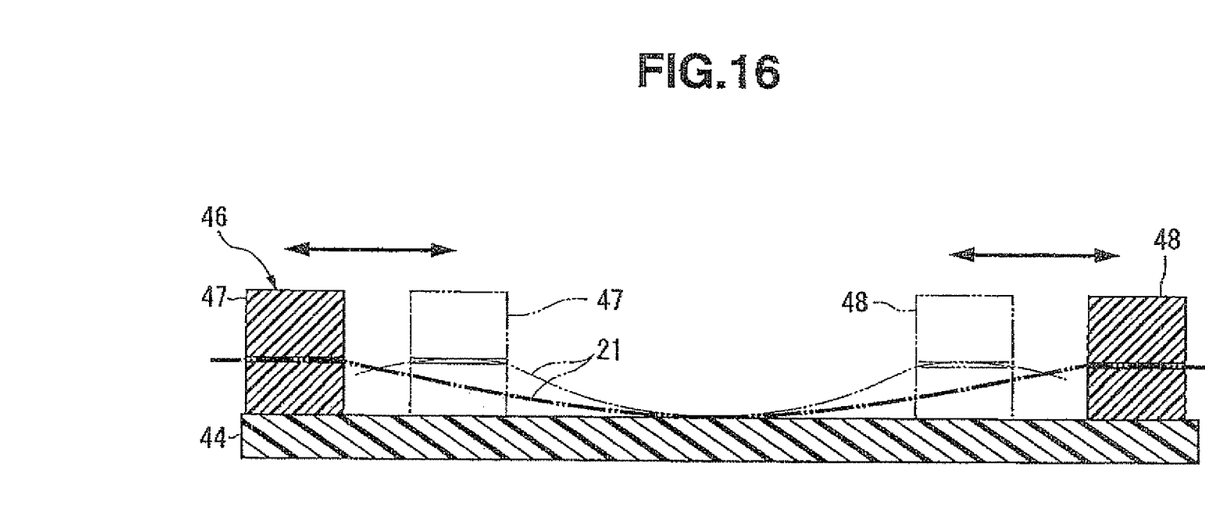
FIG. 16 is a sectional view showing the second embodiment of the chart holding portion.

A chart holding portion of a spectacle edging assist device according to the present invention can be configured as shown in FIG. 15 or 16. The same reference numerals as in FIGS. 1 to 14 denote the same or equivalent members in FIGS. 15 and 16, and a detailed description thereof will not be given as needed.

A chart holding portion 41 shown in FIG. 15 includes a pair of left and right clamp portions 42 and 43 which hold the two horizontal ends of a layout chart 21, and a support portion 44 which supports the clamp portions 42 and 43. A plurality of slits 45 into which the layout chart 21 is to be movably inserted are formed in each of the clamp portions 42 and 43 to be aligned vertically. The left slits 45 and the right slits 45 are formed to have a bilaterally symmetrical shape. The slits 45 are formed such that the layout chart 21 is curved downward and has a slit-specific curvature.

The lowermost slits among the slits 45 in FIG. 15 are formed such that the layout chart 21 has a minimum curvature. Also, the uppermost slits among the slits 45 in FIG. 15 are formed such that the layout chart 21 has a maximum curvature. The remaining slits 45 which are vertically aligned between the uppermost and lowermost slits 45 are formed such that the layout chart 21 has a curvature which gradually changes between its minimum and maximum values.

The chart holding portion 41 shown in FIG. 15 is fixed on a base (not shown), and is used upon inserting the layout chart 21 into a pair of slits 45 which allow the layout chart 21 to have a curvature corresponding to the frame curve of a spectacle frame 5. Note that when the chart holding portion 41 is used as well, the spectacle frame holder 4 shown in FIGS. 1 to 13 can be used to hold the spectacle frame 5.

A chart holding portion 46 shown in FIG. 16 includes a pair of left and right clamp portions 47 and 48 which hold the two horizontal ends of the layout chart 21, and a support portion 44 which supports the clamp portions 47 and 48. Only one slit 50 into which the layout chart 21 is to be movably inserted is formed in each of the clamp portions 47 and 48. The clamp portions 47 and 48 are supported by the support portion 44 to be movable horizontally. That is, in the chart holding portion 46 shown in FIG. 16, the curvature of the layout chart 21 can be changed by changing the interval between the left clamp portion 47 and the right clamp portion 48.

The chart holding portion 46 shown in FIG. 16 is used upon fixing it onto a base (not shown). When the chart holding portion 46 is used as well, the spectacle frame holder 4 shown in FIGS. 1 to 13 can be used to hold the spectacle frame 5. The same effect as in the embodiment shown in FIGS. 1 to 4 can also be produced when the chart holding portion is configured as shown in FIGS. 15 and 16.

The spectacle edging assist device according to the present invention also has the following characteristic details. The concavely curved surface of each chart holding portion used in a spectacle edging assist device defined in claim 3 is formed such that the spectacle frame has right and left parts with equal horizontal dimensions.

A holding member of a spectacle frame holding portion used in a spectacle edging assist device defined in claim 4 includes a pressing plate which can come into contact with the rim portion of the spectacle frame, and a protrusion which can come into contact with the nose pad portions of the spectacle frame.

A spectacle edging assist device defined in any one of claims 1 to 4 further includes a foldaway auxiliary leg member at its lower end. The auxiliary leg member can move between a use position at which the chart holding portion is tilted so that the upper portion of the spectacle frame held on the spectacle frame holding portion becomes higher than its lower portion while the spectacle frame is in use, and an accommodation position at which the upper and lower portions of the spectacle frame have the same level.

According to the present invention, the layout chart is bent with a curvature corresponding to the frame curve of the spectacle frame, thereby coming into contact with the end pieces of the spectacle frame. Also, the spectacle frame is fixed so as not to move while it overlaps the bent layout chart. Hence, even when a spectacle frame having a relatively large frame curve is used, the rim portion and the layout chart can easily be observed while they overlap each other.

Examples of indices provided on the layout chart include the optical centers, distance eyepoints, and near eyepoints of a plurality of lenses, and the outer shapes of a plurality of lenses having different outer diameters. That is, according to the present invention, even when a spectacle frame having a relatively large frame curve is used, the operator can precisely check the positions of the optical center, distance eyepoint, and near eyepoint of a lens relative to the spectacle frame. Also, according to the present invention, even when a spectacle frame having a relatively large frame curve is used, a lens having an outer diameter which matches the spectacle frame can precisely be selected.

Moreover, according to the present invention, even when a spectacle frame having a relatively large frame curve is used, the operator can precisely determine whether the near eyepoint of the target lens falls within the rim portion.

In the spectacle edging assist device according to the present invention, the end pieces of the spectacle frame are in contact with the layout chart, so the curvature of the layout chart never becomes smaller than that of the frame curve. That is, the layout chart is bent along the front portion of the spectacle frame or to have a curvature larger than that of the frame curve so as to form a gap between it and the bridge portion of the spectacle frame.

If the layout chart is bent along the front portion, the indices of the layout chart and the rim portion of the spectacle frame can easily be compared with each other, and a precise comparison result can be obtained as well. When the indices provided on the layout chart are the outer shapes and optical centers of a plurality of lenses, a lens having an appropriate outer diameter can be selected. "Appropriate" means herein that no missing portion is generated between a lens and the rim portion while the lens is attached on the rim portion.

On the other hand, if the curvature of the layout chart is larger than that of the frame curve, the layout chart is inclined more than the rim portion. Hence, the horizontal dimension of a portion in the layout chart, which can be seen through the rim portion, is smaller than its actual horizontal dimension. That is, in this case, a lens which appears smaller than its actual size, that is, a lens larger than the rim portion can be selected.

Therefore, according to the present invention, the use of a layout chart for outer diameter determination allows selection of a lens having an appropriate outer diameter or a lens having an outer diameter larger than that of the rim portion. Such a lens never has a missing portion generated between it and the rim portion while being attached on the rim portion after framing. As a result, according to the present invention, a spectacle edging assist device capable of selecting a lens which matches a spectacle frame having a relatively large frame curve can be provided.

According to the spectacle lens suitability determining method according to the present invention, determination is performed while the layout chart appears to be equal in size to the spectacle frame or smaller in the horizontal direction of the spectacle frame than its actual horizontal dimension. While the layout chart appears to be equal in size to the spectacle frame, a precise determination result can be obtained. In contrast, if it is determined whether the outer diameter of a lens matches the rim portion while the layout chart appears smaller in the horizontal direction than its actual horizontal dimension, a lens which appears smaller than its actual size, that is, a lens larger than the rim portion matches the rim portion. Such a lens never has a missing portion generated between it and the rim portion while being attached on the rim portion after framing.

Therefore, according to this method, even when a spectacle frame having a relatively large frame curve is used, the suitability of lenses can precisely be determined.

What is claimed is:

1. A spectacle edging assist device comprising:
   a flexible layout chart on which an index used to determine suitability of a lens while said layout chart is superposed on a spectacle frame is drawn;
   a chart holding portion which holds said layout chart upon bending said layout chart to have a curvature corresponding to a frame curve of the spectacle frame, and also holds the layout chart to be movable in a horizontal direction of the spectacle frame; and
   a spectacle frame holding portion which holds the spectacle frame so that a front portion thereof overlaps said layout chart,
   wherein said chart holding portion brings at least two end pieces of the spectacle frame into contact with said layout chart.

2. A device according to claim 1, wherein
   a gap is formed between said layout chart held on said chart holding portion and a bridge portion of the spectacle frame held on said spectacle frame holding portion.

3. A device according to claim 1, further comprising:
   a base portion which detachably supports said chart holding portion,
   wherein said chart holding portion is selected from a plurality of chart holding portions having different curvatures so that said chart holding portion holds said layout chart along a concavely curved surface, and
   a chart holding portion having a concavely curved surface with a curvature closest to a curvature of the frame curve of the spectacle frame is selected as said chart holding portion to be attached onto said base portion.

4. A device according to claim 1, wherein
   said spectacle frame holding portion comprises holding members which clamp and hold the front portion of the spectacle frame, and
   said holding members can move in a vertical direction, which is defined when the spectacle frame is in use, relative to the layout chart.

5. A spectacle lens suitability determining method comprising the steps of:
   bending, in a direction identical to a direction of a frame curve of a spectacle frame, a layout chart on which an index used to determine suitability of a lens while the layout chart is superposed on the spectacle frame is drawn;
   positioning the spectacle frame to fall within the layout chart, and superposing the spectacle frame on the layout chart so that at least two end pieces of the spectacle frame come into contact with the layout chart; and
   determining the suitability of the lens by moving at least one of the layout chart and the spectacle frame relative to the other to position the index relative to the spectacle frame,
   wherein the determining step is executed while the layout chart is bent with a curvature not less than a curvature which matches the frame curve of the spectacle frame.

* * * * *